Dec. 2, 1930.  A. W. KJELLBERG  1,783,922

CONNECTING ROD

Filed March 9, 1928

Inventor

Anders W. Kjellberg

By Blackmore, Spencer & Hiulr

Attorneys

Patented Dec. 2, 1930

1,783,922

UNITED STATES PATENT OFFICE

ANDERS W. KJELLBERG, OF DETROIT, MICHIGAN, ASSIGNOR TO GENERAL MOTORS CORPORATION, OF DETROIT, MICHIGAN, A CORPORATION OF DELAWARE

CONNECTING ROD

Application filed March 9, 1928. Serial No. 260,315.

My invention relates to connecting rods and more particularly to an improved manner of forming therein a passage for conducting lubricant from the crankshaft bearing to the wrist pin bearing. It has been found necesssary when forming an oil passage in a connecting rod, to add metal around the passage for strengthening purposes. This increases the weight of the rod which is very undesirable.

An object of my invention is to provide a connecting rod in which the oil passage is so located that the weight of the rod is not increased over that of a rod of similar size, but in which there is no passage.

Other objects and advantages will be apparent upon referring to the specification and accompanying drawing, in which.

Figure 1:
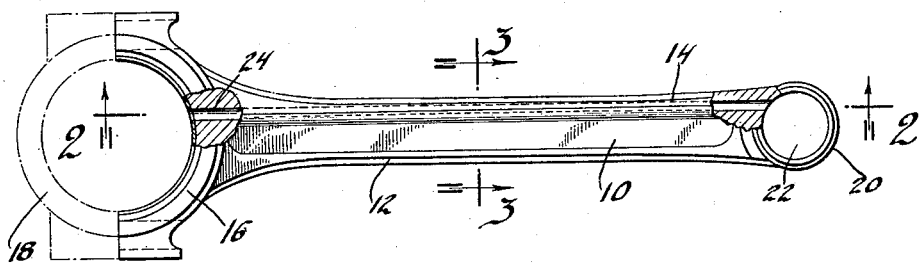
Figure 1 is a side view of my improved connecting rod.
Figure 2:
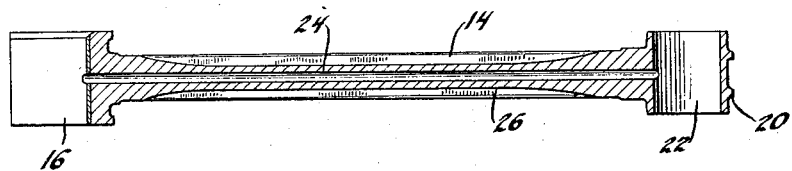
Figure 2 is a section on the line 2—2 of Figure 1.

In the drawing is illustrated a connecting rod of substantially I-beam cross section, having a web portion 10 and flange portions 12 and 14. At the end 16 the rod is enlarged to form a bearing adapted to be clamped against the crankshaft by a cap 18, in the usual manner. The opposite end 20 is provided with an opening 22, in which the usual wrist pin is journalled. In order to properly lubricate the wrist pin, it is desired to conduct lubricant from a passage in the crankshaft to the wrist pin. This has been done in the past by forming a hole in the center of the connecting rod web, and adding material to the web around the passage to strengthen the rod. This has always resulted in increasing the weight of the rod, which is undesirable because it tends to cause the engine to vibrate at certain speeds. Also, pipes have been connected between the crankshaft bearing and the wrist pin bearing, on the outside of the rod, to conduct lubricant up to the wrist pin bearing. This is objectionable because due to the very high speeds at which the rod operates, the pipe is apt to be torn loose from the rod by the action of inertia force.

Figure 3:
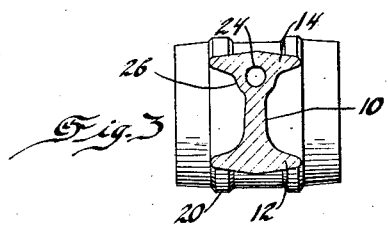
Figure 3 is a section on the line 3—3 of Figure 1.

In order to overcome these objections, I propose to locate the passage 24 substantially at the junction of the web 10 and the flange portion 14. In order not to reduce the strength of the rod, it is necessary to enlarge the usual fillet as at 26 when forging the rod. The passage 24 is then drilled in the position illustrated in Figure 3. The proportions of the rod are so calculated that the amount of material removed in drilling the passage 24, will at least offset the added weight caused by the enlarged fillet 26, while at the same time not decreasing the structural strength of the rod. By locating the passage as shown, the enlarged fillet serves to increase the strength of the rod much more than if a corresponding amount of metal were added at the center or neutral axis of the rod. It will be readily seen that since the neutral axis is the point of least stress, metal added to this point will not increase the strength of the rod materially.

The result is that I obtain a rod which is not any heavier than a standard rod of similar size in which there is no oil passage. In fact, I have found that my improved rod actually weighs less than a similar rod without an oil passage, and that due to its changed shape, it is actually stronger than a standard rod.

It is thought that from the foregoing taken in connection with the accompanying drawing that the construction and operation of the device will be apparent to those skilled in the art, and that various changes in size, shape, and proportion and details of construction may be made without departing from the spirit and scope of the appended claims.

I claim:

1. A connecting rod having a web and flange portions, and a lubricant conducting bore formed in said rod substantially at the junction of said web and one of said flange portions.

2. A connecting rod having a web and flange portions, and a longitudinally extending lubricant conducting passage formed in said rod adjacent one of said flange portions, said passage being surrounded by metal so that it is closed except at its ends.

3. A connecting rod having a web and flange portions, an enlarged fillet portion connecting said web and one of said flange portions, and a lubricant conducting passage formed in said fillet portion, the increase in weight due to said enlarged fillet portion being offset by the material removed in forming said passage.

4. A connecting rod of I-beam cross section, having formed therein a lubricant conducting passage extending from end to end of said rod and located at a point well removed from the neutral axis of said rod, said passage being closed except at its ends.

In testimony whereof I affix my signature.

ANDERS W. KJELLBERG.